United States Patent [19]
Münzel et al.

[11] Patent Number: 5,620,366
[45] Date of Patent: Apr. 15, 1997

[54] DIFFUSE VENTILATION SYSTEM FOR PASSENGER VEHICLES AND METHOD FOR MAKING SAME

[75] Inventors: Wolf-Dietrich Münzel, Altdorf; Jutta Schmidtke, Stuttgart; Dietrich Hamm, Sindelfingen; Michael Kelz, Aidlingen, all of Germany

[73] Assignee: Mercedes-Benz AG, Stuttgart, Germany

[21] Appl. No.: 617,646

[22] Filed: Mar. 13, 1996

[30]     Foreign Application Priority Data

Mar. 13, 1995 [DE] Germany .......................... 195 08 983.9

[51] Int. Cl.⁶ ...................................................... B60H 1/34
[52] U.S. Cl. ................................................ 454/152; 454/296
[58] Field of Search ................................. 454/108, 152, 454/137, 296

[56]              References Cited

FOREIGN PATENT DOCUMENTS 1909519  10/1963  Germany .
56-31808  3/1981  Japan ................................. 454/137
2120778  12/1983  United Kingdom ................. 454/296

*Primary Examiner*—Henry A. Bennett
*Assistant Examiner*—Derek S. Boles
*Attorney, Agent, or Firm*—Evenson McKeown Edwards & Lenahan, PLLC

[57]              ABSTRACT

A system is provided for the diffuse ventilation of a vehicle interior in a dashboard area which, for avoiding manufacturing problems and for the purpose of an advantageous mounting, has an insert which is composed of a top and bottom part and which is inserted into the dashboard flush with its top side. In the bottom part, a plurality of separate channels are formed which extend in parallel to one another, are open toward the top, extend in the longitudinal direction of the insert and are covered directly by the top part.

17 Claims, 1 Drawing Sheet

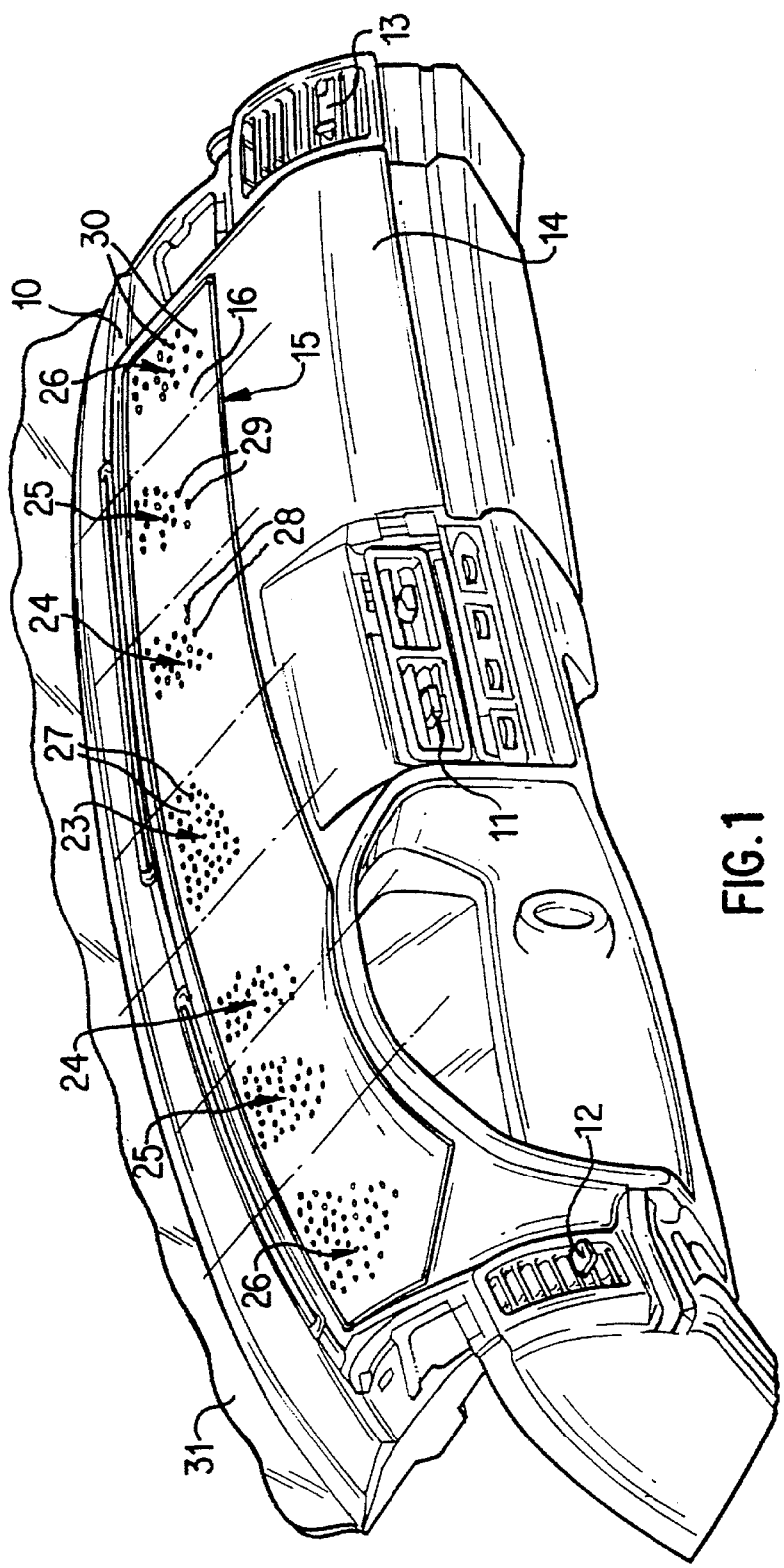
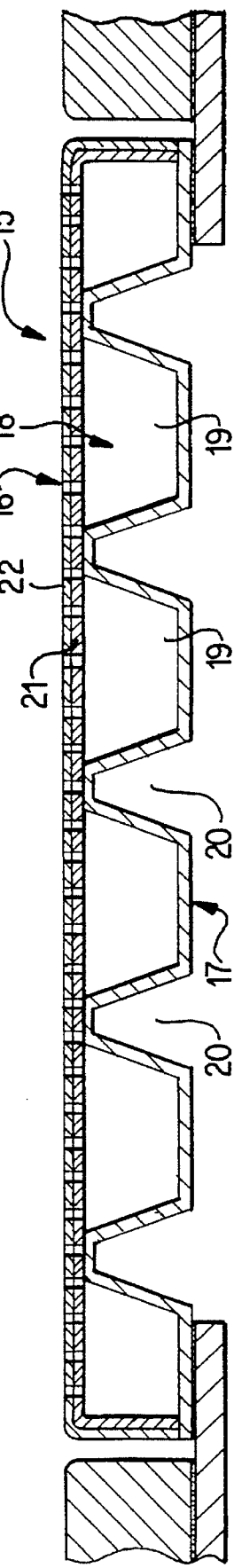

DIFFUSE VENTILATION SYSTEM FOR PASSENGER VEHICLES AND METHOD FOR MAKING SAME

BACKGROUND AND SUMMARY OF THE INVENTION

This invention relates to a system for the diffuse ventilation of a vehicle interior in the area of a dashboard extending along the windshield having a top part visible to the vehicle occupants which has a plurality of air outlet openings, and having a bottom part which is covered by the top part and which, together with the top part, bounds an air distribution space connected to an air feeding device.

In the case of a known ventilation system of this type (German Patent Document DE-GM 1 909 519), the top part is formed by the dashboard or the instrument panel itself and the air feeding device is connected, by way of a connection opening arranged in the center of the bottom part, with the air distribution space enclosed by the top part and the bottom part. The top part is manufactured corresponding to the desired contour of the dashboard or of the instrument panel and is very arched in the forward area pointing toward the seats. As a result, the air outlet holes situated in this area have hole axes which are sloped with respect to the vertical line.

In the case of the construction of the dashboard or the instrument panel customary today consisting of a rigid support, a foamed material (PU foam) covering the support, and of a deep-drawn surface foil covering the foamed material, the perforation of the dashboard results in considerable problems with respect to manufacturing techniques so that the described ventilation system cannot be implemented in series at reasonable cost.

It is an object of the invention to provide a ventilation system for the diffuse ventilation of the initially mentioned type for the dashboard area which, while the conventional structure of the dashboard is not changed, significantly simplifies the manufacturing and ensures a uniform, draft-free diffuse ventilation while at the same time reducing the heat radiation of the dashboard caused by the radiation of the sun.

In the case of a ventilation system for a diffuse ventilation of the type referred to above, this object is achieved according to the invention by providing an arrangement wherein the top part and the bottom part are connected to form an insert which is disposed in the dashboard and is flush with its top side, and wherein a plurality of separate channels are formed in the bottom part which are parallel with respect to one another, are open toward the top, extend in the longitudinal direction of the insert and are covered directly by the top part.

According to the invention, the housing according to the invention of the air distribution space for the diffuse ventilation in a separate insert which is flush with the surface of the dashboard or of the instrument panel, permits the manufacturing of the ventilation system according to freely selectable manufacturing processes whose selection is not limited by the preset structure of the dashboard. The insert as well as the dashboard with the required recess for receiving the insert are manufactured separately, in which case the manufacturing criteria may be selected independently of one another according to cost aspects. The providing of the separate channels in the bottom part, on the one hand, increases the stiffness of the insert and, on the other hand, permits a better control of the diffuse air flow during the exit from the insert in that, by means of the channel system, a uniform pressure drop is achieved with respect to the whole volume of the air distribution space.

Furthermore, the insert which is separate from the dashboard has mounting advantages because the accessibility of parts below the insert in the area of the dashboard is significantly improved.

Advantageous embodiments of the ventilation system according to the invention with expedient developments and further developments of the invention are described herein.

According to a preferred embodiment of the invention, several hole areas with a different hole pattern are arranged behind one another viewed in the longitudinal course of the top part, thus transversely to the longitudinal axis of the vehicle. By means of the appropriate construction of the hole patterns in the individual hole areas, the air distribution and a noise optimization are made uniform while the diffuse ventilation is maximal. For any surface design of the dashboard to which the shape of the insert must be adapted, Such an optimization can be carried out by a corresponding construction of the hole patterns in the different hole areas, that is, by determining the number of holes, the hole diameter and the slope of the hole axes with respect to the surface of the top part. The construction of the hole patterns is dependent on adjacent points of the bottom part and the configuration of connection openings for the air feeding device provided in the bottom part.

In an embodiment of the invention in which the connection opening for the air feeding device is arranged in the center of the bottom part, the holes situated in the center hole area of the top part have the smallest hole diameter and, originating from this hole area, at both sides toward the outside, additional hole areas adjoin, preferably mirror symmetrically to the first hole area. The holes of these additional hole areas, within the respective hole area, have a constant hole diameter which increases, however, from hole area to hole area, the holes situated in the two exterior hole areas located next to the ends of the top part having the largest hole diameter.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective representation of the frontal area of an interior of a motor vehicle with a dashboard and a ventilation system for a diffuse ventilation, and constructed according to a preferred embodiment of the invention;

FIG. 2 is a cross-sectional view of the ventilation system in FIG. 1.

DETAILED DESCRIPTION OF THE DRAWINGS

FIG. 1 is a perspective view of the frontal area of an interior of a motor vehicle directly behind a windshield bounding the vehicle interior toward the front and marked as a cutout by reference number 31. A dashboard 10, also called an instrument panel, extends along the windshield 31. In addition to instruments for the motor vehicle which are not shown here, various air nozzles are provided in the dashboard for the direct ventilation. These air nozzles include a center nozzle 11 and two side nozzles 12, 13. A glove compartment or airbag compartment 14 which is shown here in a closed position is also provided on the dashboard. In addition, a system for the diffuse ventilation out of the area of the dashboard 10 is provided which has an insert 15 situated in the dashboard 10 and flush with the top side of the dashboard 10 as well as an air feeding device which is connected to the insert 15 and is not shown here. The ventilation nozzles 11–13 are also connected to this air feeding device, in which case, between an assembly generating the air flow and the ventilation nozzles 11–13 as well as the insert 15, normally an air distribution box which is known per se is arranged which has the corresponding outlets to the ventilation nozzles 11–13 and to the insert 15.

As illustrated in the sectional representation of FIG. 2, insert 15 is composed of a top part 16 and of a bottom part 17. Between one another, the top part and the bottom part 16, 17 enclose an air distribution space 18 which is divided into a plurality of separate channels 19 which are situated in parallel to one another, are open toward the top and extend in the longitudinal direction of the insert 15. The channels 19 have a trapezoidal cross-section and are covered on their open top side directly by the top part 16. They are formed in a longitudinally continuous manner by the stamping-out or deep drawing of parallel ribs 20 from the bottom part and reach up to the top part 16. In addition to influencing the air flow, they provide the insert 15 with a considerable inherent stiffness. Naturally, the air channels 19 may also be constructed with a rectangular clear opening.

The top part 16 consists of a stiff support 21 and of a PVC- or PP-foam foil 22 which covers the support 21. Instead of the foam foil, a textile fabric may also be used. The support 21 and the foil 22 are perforated, as indicated in FIG. 1. In this case, the perforation of the top part 16 takes place in several hole areas which, viewed in the longitudinally course of the top part 16, are arranged behind one another. In FIG. 1, the individual hole areas are differentiated from one another by dash-dotted lines. The central hole area has the reference number 23 and the hole areas originating from there and adjoining toward both sides to the outside have the reference numbers 24 to 26. The hole patterns of the hole areas 23 to 26 are determined by the number of holes, the hole diameter and the alignment of the hole axes with respect to the surface of the top part 16 and have different constructions. The construction of the hole areas 23–26 in this case depends on the shape of the top part 16 to be adapted to the dashboard 10 and on the position and the number of the connection openings for the air feeding device in the bottom part 17 of the insert 15.

In the example of FIG. 1, a single, centrally arranged connection opening for the air distribution box is provided in the bottom part 17 and is connected with all six channels 19 in the bottom part 17. In this case, the holes 27 situated in the hole area 23 have the smallest diameter which is constant within the hole area 23. The holes 28 in the two hole areas 24 situated on the left and on the right of the hole area 23 have a slightly larger diameter which, in turn, is constant within the hole area 24. The holes 29 in the two hole areas 25 adjoining on the left and the right have a still larger hole diameter; and the holes 30 in the two most exterior hole areas 26 have the largest hole diameter. In this case, the hole axes of the holes 27 to 30 may be aligned such that they point toward the vehicle seats; thus, are sloped in this direction with respect to the surface of the top part 16. Basically, the hole patterns in the different hole areas 23 to 26 are to be optimized such that, while taking into account the pressure drop in the channels 19, a uniform air distribution of the exiting air ms achieved over the whole dashboard 10 and a sound optimization, that is, an air exit is achieved which is as noiseless as possible. For this reason, it may sometimes be advantageous to reduce the hole diameters again in the most extreme hole areas 26 so that no more air than desired flows out as a result of the air which may sometimes accumulate at the channel ends.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. System for the diffuse ventilation of a vehicle interior in an area of a dashboard extending along a windshield, having a top part visible to vehicle occupants which has a plurality of air outlet openings, and having a bottom part which is covered by the top part and which, together with the top part, bounds an air distribution space connected to an air feeding device, wherein the top part and the bottom part are connected to form an insert which is disposed in the dashboard and is flush with its top side, and wherein a plurality of separate channels are formed in the bottom part which are parallel with respect to one another, are open toward the top, extend in the longitudinal direction of the insert and are covered directly by the top part.

2. System according to claim 1, wherein the channels are formed with one of a trapezoidal and rectangular cross-section by one of stamping out and deep drawing of parallel ribs in the bottom part which reach up to the top part.

3. System according to claim 1, wherein the air outlet openings include several hole areas with respective different hole patterns, arranged behind one another as viewed in a longitudinal course of the top part.

4. System according to claim 3, wherein the hole patterns of the hole areas are determined by the hole number, the hole diameter and the alignment of the hole axes.

5. System according to claim 4, wherein the hole diameter of the holes within a respective hole area is constant.

6. System according to claim 3, wherein the hole patterns of the hole areas are formed as a function of the shape of the top part adapted to the dashboard and of the position and the number of connection openings for the air feeding device in the bottom part.

7. System according to claim 5, wherein the hole patterns of the hole areas are formed as a function of the shape of the top part adapted to the dashboard and of the position and the number of connection openings for the air feeding device in the bottom part.

8. System according to claim 6, wherein the bottom part has a connection opening arranged in its center, wherein the holes situated in a first central hole area of the top part have the smallest hole diameter and that originating from there toward both sides to the outside, additional hole areas extend preferably mirror-symmetrically to the first hole area, the holes of these additional hole areas having a hole diameter which is constant within the respective hole areas and which changes from one hole area to the next hole area, the hole diameters of the holes being optimized such that, while the pressure drop is taken into account which occurs from the connection opening toward the channel ends, a uniform air distribution is achieved over all hole areas.

9. System according to claim 1, wherein the top part is formed by a rigid support which is covered by a foil made of foam material and a textile fabric material.

10. System according to claim 7, wherein the top part is formed by a rigid support which is covered by a foil made of foam material and a textile fabric material.

11. A method of making a system for the diffuse ventilation of a vehicle interior in an area of a dashboard extending along a windshield, including a top part visible in use to vehicle occupants which has a plurality of air outlet openings, and a bottom part which, together with the top part, bounds an air distribution space connected to an air feeding device, said method comprising:

forming a bottom part with a plurality of separate air channels open toward a top, forming a top part having a predetermined pattern of holes therethrough which form air ventilation openings to a vehicle interior when in an in-use position, and connecting the top part to the bottom part to form a preassembled insert for a vehicle dashboard.

12. A method according to claim 11, wherein said forming a bottom part includes press stamping of a flat plate member to form parallel ribs which bound the separate air channels.

13. A method according to claim 11, wherein said forming a bottom part includes deep drawing a flat plate member to form parallel ribs which bound the separate air channels.

14. A method according to claim 11, wherein said forming the top part includes forming said predetermined pattern of holes with a plurality of hole areas with respective different hole patterns.

15. A method according to claim 14, wherein the bottom part has a connection opening arranged in its center, wherein the holes situated in a first central hole area of the top part have the smallest hole diameter and that originating from there toward both sides to the outside, additional hole areas extend preferably mirror-symmetrically to the first hole area the holes of these additional hole areas having a hole diameter which is constant within the respective hole areas and which changes from one hole area to the next hole area, the hole diameters of the holes being optimized such that, while the pressure drop is taken into account which occurs from the connection opening toward the channel ends, a uniform air distribution is achieved over all hole areas.

16. A method according to claim 11, wherein the top part is formed by a rigid support which is covered by a foil made of foam material and a textile fabric material.

17. A method according to claim 14, wherein the top part is formed by a rigid support which is covered by a foil made of foam material and a textile fabric material.

* * * * *